(12) United States Patent
Albrecht et al.

(10) Patent No.: US 8,404,278 B2
(45) Date of Patent: Mar. 26, 2013

(54) POLYIMIDE MICROPARTICLES

(75) Inventors: Wolfgang Albrecht, Teltow (DE);
Roland Hilke, Teltow (DE); Karola Lützow, Berlin (DE); Mario Rettschlag, Stahnsdorf (DE); Filiana Santoso, Berlin (DE); Thomas Weigel, Wilhelmshorst (DE)

(73) Assignee: Helmholtz-Zentrum Geesthacht Zentrum fur Material und Kusten forschung GmbH, Geesthacht (DE)

( * ) Notice: Subject to any disclaimer, the term of this patent is extended or adjusted under 35 U.S.C. 154(b) by 1746 days.

(21) Appl. No.: 11/086,714

(22) Filed: Mar. 22, 2005

(65) Prior Publication Data

US 2005/0163860 A1 Jul. 28, 2005

Related U.S. Application Data

(63) Continuation-in-part of application No. PCT/DE03/02879, filed on Aug. 30, 2002.

(30) Foreign Application Priority Data

Sep. 30, 2002 (DE) .................................. 102 45 545

(51) Int. Cl.
*A61K 9/50* (2006.01)
(52) U.S. Cl. ....................................... 424/501; 424/489

(58) Field of Classification Search ................... 424/501, 424/489
See application file for complete search history.

(56) References Cited

U.S. PATENT DOCUMENTS 7,273,551 B2 * 9/2007 Albrecht et al. ......... 210/500.39

FOREIGN PATENT DOCUMENTS

| DE | 4117501 A1 * | 12/1992 |
|----|----|----|
| DE | 101 11 666 | 9/2001 |
| GB | 2 198 739 | 6/1988 |
| JP | 60 221425 | 11/1985 |
| JP | 61 016918 | 1/1986 |
| JP | 2000248063 | 9/2000 |
| WO | WO 02072246 A1 * | 9/2002 |

* cited by examiner

*Primary Examiner* — James Rogers
(74) *Attorney, Agent, or Firm* — VLP Law Group LLP; Kent H. Cheng

(57) ABSTRACT

The invention relates to a polyimide microparticles which can be obtained by means of the following steps: a) a polymer solution consisting of at least one polyimide polymer and a solvent or a solvent mixture is produced according to methods known per se, b) microparticles are formed from the polymer solution by spraying or by thermal phase inversion, c) the microparticles obtained in step b) are treated with an aqueous functionalization solution containing an amine-containing modifier at a high temperature, with or without stirring, and d) the modified obtained are washed and optionally dried, according to methods known per se.

11 Claims, 1 Drawing Sheet

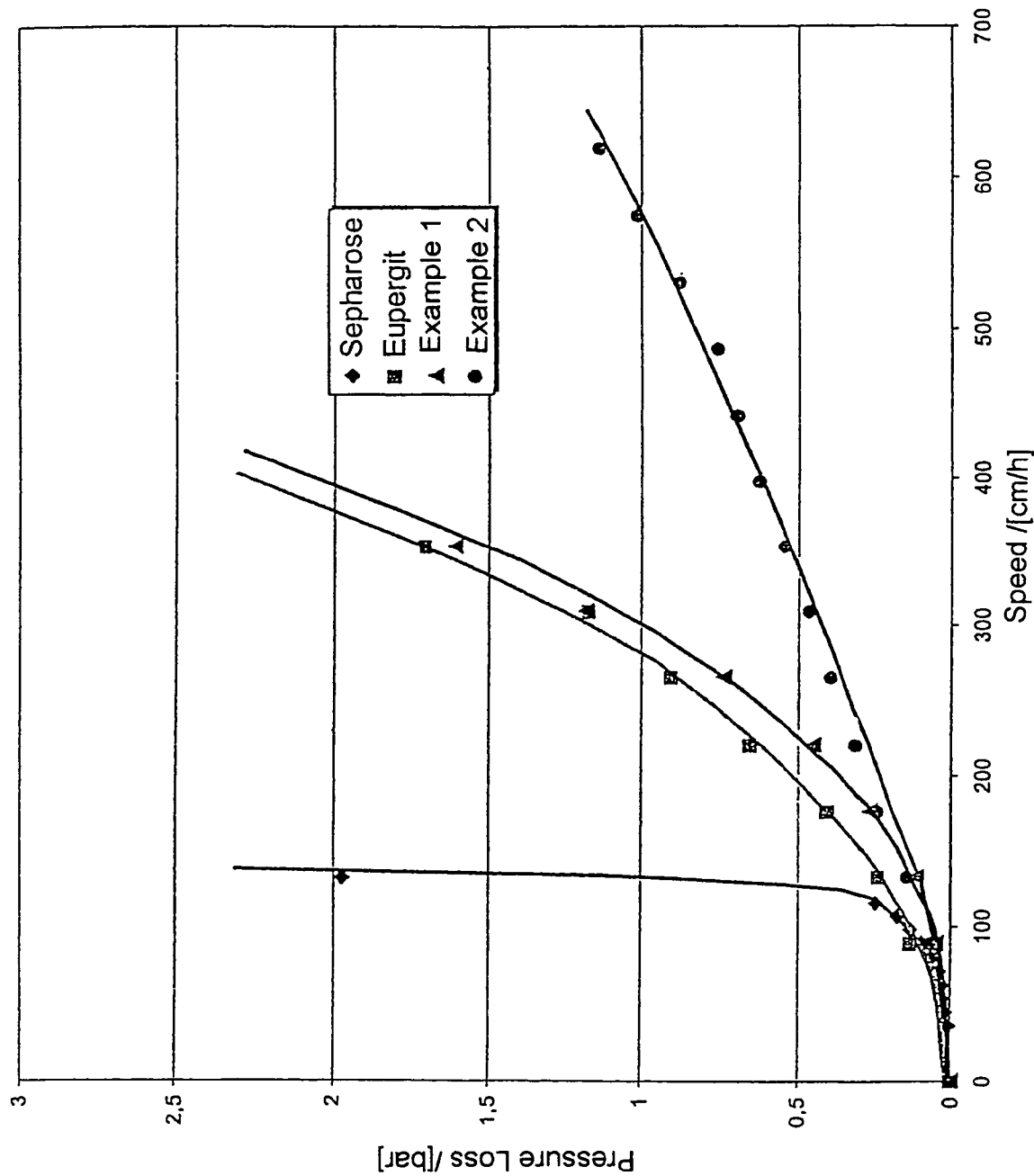

POLYIMIDE MICROPARTICLES

This is a Continuation-In-Part Application of International Application PCT/DE2003/002879 filed Aug. 30, 2002 and claiming the priority of German application 102 45 545.7 filed Sep. 30, 2002.

BACKGROUND OF THE INVENTION

The invention relates to polyimide carrier matrices, a method of manufacturing the articles and to their use.

Methods for the manufacture of particulate carrier matrices (membranes) with different separating profiles are known and commercially available on the basis of various polymers. Methods for their manufacture are known to the person skilled in the art and are based in practice on basic principles which will be shortly described below:

Preformed polymers preferably of natural or semi-synthetic origin which already have chemical functions for the attachment of ligands, are dissolved in an aqueous solvent. The solution is dispersed in a liquid which is not mixable with this polymer solution. The solution droplets are then solidified for example by netting or other chemical or physical processes to form micro-particles.

Under these conditions, the polymer solution is transformed to spherical solution droplets by dispersion in a non-mixable organic medium in a simple manner. Basic conditions for the application of this basic procedure are good dispersion capability of the polymer solution possibly supported by surface active substances in the dispersion medium. The applicability is therefore limited to the dispersion of aqueous polymer solutions in a hydrophobic organic dispersion medium or, respectively, in a chlorinated hydrocarbon; consequently, only water soluble polymers can be used as matrix former. With additives and the kind of solidification, the pore profile of the support matrix so made or, respectively, the microparticles can be affected but the often required coarse pore structure with high pore density at the particle surface is not obtained.

Furthermore, basically gel-like support matrices are formed whose pore structure is formed exclusively by swelling of the particle. Permanently porous support matrices can basically not be manufactured by this method. Depending on the amount of fixation, highly swelled and therefore easily deformable matrices are formed which are compressed when subjected to economical high flow passage rates and then have a high flow resistance. The use of low-swelling synthetic polymers which are preferably soluble in polar or aprotic solvents is not possible with this method because of the unfavorable mixing conditions with dispersing systems although interesting property profiles can be expected. Examples of support matrices which are manufactured in accordance with the principle, are Sepharose-types TM (preferably manufactured from netted Agarose) and cellulose beads.

A second basic method is based on the use of chemically different, usually hydrophobic, monomers which can be polymerized and which are dispersed together with a polymerization initiator and with additives (chemically very different, organo-soluble, but water insoluble substances) in a non-mixable liquid, preferably water, possibly with the addition of surface active compounds. The monomer/addition-droplets of the dispersions formed in the process are subsequently solidified by a netted precipitation polymerization thereby forming microparticles. During this precipitation polymerization process generally permanent porous support matrices of synthetic netted polymers with little swelling are formed in aqueous media. Characteristic is that the polymer is built in the process of the particle manufacture. Many possibilities of influencing the porosity of the microparticles formed are described in the literature. In a special embodiment, the dispersed droplets of the organic phase are solidified before the polymerization and polymerized in that state.

The second basic method for the manufacture of support matrices however is not applicable if polymers, which have already been synthesized, are to be formed into microparticles. In accordance with this dispersion principle organo-soluble monomers with hydroxyl- amino- and/or carboxyl functions must be selected which significantly limits the content of chemical functions for the binding of affinity ligands. For generating or, respectively increasing, the binding functions capable of coupling, such carrier matrices must be provided, before the application, with corresponding chemical functions to make binding functions available in sufficient quantities. This again requires often the use of aggressive media and harsh after treatment conditions.

Finally, a third basic process is known whereby microparticles can be produced from polymer solutions in analogy to a thermal phase inversion during the formation of the membrane. For realizing this basic process, a solvent mixture and a suitable dispersion medium must be found which corresponds to the described behavior. To this end, from the polymer to be deformed a polymer solution is formed at a raised temperature wherein, upon controlled cooling to room temperature, the polymer solution is subject to a phase inversion. When such a polymer solution is dispersed in a phase-forming dispersion medium (micro-droplet formation) and the dispersion is subsequently cooled, a fixed, generally porous, micro-particle is formed.

In principle, it should be possible to form in accordance with this third basic process low-swell carrier matrices of synthetic polymers and, dependent on the polymer used, chemical groups which can be functionalized. It is however a disadvantage of this third basic process that it is difficult to control the process so as to obtain particles of the respective particle size and to find corresponding solution/dispersion systems. Furthermore, the formed particles have an outer surface with relatively little porosity. The pore inlets have a small pore diameter which makes it difficult for large-volume molecules to enter the particles.

Such particles therefore have little adsorption capacity for large molecule volume substances in spite of a relatively large inner surface.

In all these manufacturing methods, an interface area is established between the particles being formed and the liquid or gaseous surrounding area which, for energetic reasons, changes the surface of the particle being formed in such a way that a surface layer of little porosity, that is with a small number of pores and small pore sizes, is established. The interface layer limits the accessibility of the inner pore system of the particles. By swelling of the whole particle (utilization of the basic principle 1) the surface porosity can be moderately, but not sufficiently, increased which however brings along the disadvantage of a compression instability of the carrier matrix with the passage of a liquid.

Carrier matrices of synthetic organic polymers can be manufactured in accordance with the earlier presentation only conditionally in accordance with the third basic method, if, for dissolving the polymer forming the carrier matrix, polar aprotic solvents or mixtures of such solvents must be used. Suitable solvents can be formed but not suitable dispersion media. Still, if a sufficient number of groups of the polymers to be formed into particles which can be functionalized is present, which however is not necessarily true particularly in connection with these polymers, there is the above described disadvantage of a small surface porosity. This is particularly grave if, like in the immune-adsorption, large-volume molecules are to be removed from the medium by adsorption on a suitable functionalized carrier matrix.

It is furthermore known that polyimides can be chemically changed by amine modification. EP-A 0 401 005 describes the use of amine modifications for the netting of polyimide gas separation membranes in a heterogeneous reaction. In DE-A 41 175 01, the modification of polyimide solutions with amine modifications utilizing a homogeneous reaction in order to increase the viscosity of the polyimide significantly is described. Patents of the Applicants disclose methods of functionalizing polyimides in homogeneous (DE-A 101 11 663) and in heterogeneous (DE-A 101 11 665) reactions, which are so performed that, in both cases, a controllable, particularly a large, number of freely available chemical functions is obtained which can be used for adsorption separations in that form or after further conversions.

The state of the art concerning the presently available matrices is presented in a publication by Suoeka (Present status of apheresis technologies, Part 3: Adsorbents, Therapeutic Apheresis 1 (1997) 271-283). Applications of particular carriers in the chromatography are discussed by Hermanson et al. (Immobilized Affinity Ligand Techniques, Academic Press Inc., San Diego, New York, Boston, London, Sidney, Tokyo, Toronto, 1992, pp. 1-50). Newest developments of carrier matrices are furthermore discussed extensively in a publication by Leonard (New packing materials for protein chromatography, J. Chromatog. B 699 [1997], 3-27.

It is the object of the present invention to provide low-swell, highly porous microparticles with a high surface porosity and a large pore diameter for retaining large-volume molecules with high selectivity, speed and capacity, and a method for the manufacture thereof.

SUMMARY OF THE INVENTION

The invention relates to a polyimide microparticles which can be obtained by means of the following steps: a) a polymer solution consisting of at least one polyimide polymer and a solvent or a solvent mixture is produced according to methods known per se, b) microparticles are formed from the polymer solution by spraying or by thermal phase inversion, c) the microparticles obtained in step b) are treated with an aqueous functionalization solution containing an amine-containing modifier at a high temperature, with or without stirring, and d) the modified micro-particles obtained are washed and optionally dried.

It has surprisingly been found that functionalized microparticles which may also be called particulate carrier matrices can be provided from polyimides with the complex characteristics described. To this end, in a first process step microparticles of polyimides are manufactured. In this process step a), a polymer solution of a polyimide polymer or of several polyimide polymers and a solvent or a solvent mixture is produced in a manner known per se. Consequently, in accordance with the invention 1, 2, 3, 4 . . . that is many polyimide polymers and also 1, 2, 3, . . . that is many solvents can be used.

In a second method stage, that is, in the stage b), the polymer solution is converted, by spraying or by thermal phase inversion, to microparticles in a way known per se.

The micro-particles obtained in step b) are treated in a wet chemical process with an aqueous functionalization solution which contains an amine-containing modifier. This treatment results in an opening of the pore system of the microparticles, particularly of the particle surface with a concurrent functionalization of the inner and outer surfaces.

The polyimide microparticles obtained in step c) can be cleaned in step d) in a manner known per se by washing or another way and, if appropriate, can be dried.

If it should be necessary to increase the proportion of chemical groups that can be functionalized and/or other chemical groups, an additional method step c2) can be performed. In this stage c2), the microparticles obtained after performing the step c) are treated, after removal of the amine-containing modifier of the method step c) with an aqueous functionalization solution which contains at least another modifier. This additional modifier consists of a compound or of 2, 3 . . . or many compounds with at least two functional groups of which one group is an amine group.

The additional modifier employed in the method step c2) furthermore should not have a degrading effect.

Preferably, between the method steps a) and b), between the method steps b) and c) and between the method steps c) and c2), the obtained microparticles are washed in order to keep the content of removable constituents of the previous step low in the following step.

As a result, in accordance with the invention, with the use of polyimides as base polymer and a treatment or post treatment of the particulate start-out particles with special aqueous amine-containing solutions, micro-particles or, respectively carrier matrices with a complex property profile can be obtained.

When it is referred to a polyimide polymer not only pure polyimides but also compound classes such as poly(amide-imides), poly(ester-imides), poly(ether-imides) etc., are meant. In accordance with the invention, it is only necessary that the polymer designated here as polyimide contains in the polymer chain a sufficient number of imide groups in the main chain. As a result, each polymer which includes this imide function in sufficient numbers can be transformed by the method according to the invention to microparticles with the complex property characteristics described above. As a preferred number of imide groups, it has been found that this polyimide polymer should have at least one imide group per base unit with a mole mass of less than, or equal, 1000 g/mol. However, preferably polymers of "pure" polyimides or respectively, mixtures thereof are used, wherein, depending on circumstances, polymer additives may be added. The polyimide polymer used and also the additive or the additives which may be present, must be soluble in a common solvent or a mixture of solvents, in order to make the manufacture of the micro-particle out of the dissolved state possible. The solvent mixture may include 2, 3, 4, or many solvents or, respectively, be composed thereof.

As solvent for the manufacture of the polyimide solution or, respectively, the polymer solution, in principle, any solvent for polyimides known to the person skilled in the art or, respectively, any solvent mixture may be used, by which polymer solutions with a polymer content of preferably 1 to 20 wt % can be produced. This range of 1 to 20 wt % comprises all intermediate values and particularly all intermediate individual values, that is, consequently, 1, 2, 3, 4, 5, 6, 7, 8, 9, 10, 11, 12, 13, 14, 15, 16, 17, 18, 19 and 20 wt %.

However, preferably solvents or solvent mixtures are used for the manufacture of polymer solutions which, with a phase inversion of the polymer solution by the effects of a precipitation medium, lead at least in the surface areas of the formed particles to a foam-like morphology.

The concentration in the polymer solution is preferably 5 to 15 wt %, which applies particularly to a spray process for the manufacture of the particles. Under these conditions—depending on the selection of the manufacturing conditions and the manufacturing process—microparticles with a particle diameter of 20 μm to 1000 μm are produced which have little swelling tendencies.

In the step c), the microparticles obtained in the step b) are treated or, respectively, post-treated. The moist particles are treated with a preferably 1 to 10 wt % aqueous solution of an amine-containing modifier for a period of 5 min. to 4 h, preferably 20 min to 2 h with or without stirring at a temperature of preferably 50 to 100° C., preferably 70 to 95° C. As amine-containing modifier preferably aliphatic di- or, respectively, oligoamines or, respectively mixtures thereof are used. Particularly short-chain oliphatic di-, tri-, tetra-, or respectively, pentamines with primary and/or secondary and/or tertiary amino groups are used.

The groups interconnecting the amine groups or, respectively, spacers are of an aliphatic nature and, consequently, alkyl groups which have preferably 2, 3, 4 or 5 cations. As modifier preferably diethylentriamine is used. With the use of this modifier preferably diethylentriamine is used.

With the use of this modifier, the pore system particularly at the surface of the particles is opened but also the pores in the interior of the particles are opened. As a result, the open-pore microparticles according to the invention are formed which have a surface porosity which corresponds practically to the porosity in the interior of the particles to the porosity in the interior of the particles. At the same time with this treatment, a covalent functionalization of all surfaces with amine groups occurs. This covalent binding to microparticles occurs by reaction of the imide groups with the amine groups of the modifier thereby forming the macromolecular structure.

If, nevertheless, a higher number of functional groups of the same or different chemical nature, which can potentially be activated, is desired, in another treatment step, that is, in the method step c2) a further treatment can be provided. In this case, a functionalization solution is used with a further modifier. This further modifier may be composed of a combination of at least two functional groups per molecule, wherein at least one of the functional groups is an amine group. This compound is therefore at least a di-functional compound. However, compounds with very different chemical structures can be used. As modifier furthermore, a mixture of 2, 3 or many such compounds can be used. Compounds can be used as modifiers as they are described for example in applicants DE-A 101 11 685. These compounds are of monoamine nature and have a slight tendency to open the pore system upon performing the method steps according to the invention. They can furthermore be easily activated. As further functional groups which can be activated, preferably hydroxyl and/or carboxyl groups can be used. As another modifiers, particularly alcohol amines, amino acids, imine dioacetic acid, phenylene diamine, and polyamines of the type of the ethylene-imine may be used.

These amine groups which are bound covalently and are present in large numbers can be activated in a simple manner and can be used already in this form as absorption media, or, respectively, after binding of affinity ligands, for adsorption separations. Furthermore, these amine groups can be converted into other functional groups such as carboxyl-, hydroxyl-, or aldehyde groups, which, as is known, represent suitable functions for the binding of ligands.

Subsequently, the microparticles produced in accordance with the invention are intensely washed in a known manner in order to remove all the components of the manufacturing process which are not covalently bound, with the exception of water. If desired the microparticles can subsequently also be dried, which occurs preferably at room temperature. The microparticles produced in accordance with the invention have such a high stability with respect to drying processes that, during a mild drying process (drying at room temperature), the overall porosity of the particles changes only slightly.

The temperature conditions and the length of the treatment in the process steps c) and c2) are preferably the same but they may be different.

In summary, it can be said that the microparticles according to the invention are swell stable. They have only a small flow resistance and have a highly porous structure with a high number of surface pores with pore diameters of more than 10 nm. As a result, the porosity of the surface layers of the microparticles according to the invention is comparable with the porosity in the particle interior.

The surface areas (inner and outer surfaces) of the microparticles are provided with a large number of functional groups which can be easily activated and which therefore represent easily activatable binding locations for affinity ligands. Furthermore, a steam sterilization of the microparticles according to the invention is possible without noticeable property changes.

Subject of the invention is also a process for the manufacture of the microparticles according to the invention and the use thereof as adsorption structures for adsorptive separation. These microparticles are preferably used in combinations with peptide ligands as immuno-adsorbers.

Included in the microparticles according to the invention are also microparticles to which the ligands of various different types are bound, wherein these bindings may be covalent or of another type.

Below, the invention will be described in detail on the basis of examples for the production of the microparticles according to the invention and their properties. The polyamide used in the examples is a polyetherimide (PEI) of the Ultem 1000-type (General Electric Corp.). The manufacture of the start-out microparticles is performed for example by a spray process with subsequent precipitation-induced phase inversion in water. The percent values indicated are mass % if not otherwise noted.

For the characterization of the microparticles according to the invention, the following characterization techniques were used.

1. The particle diameter was determined by microscope examination using a graduated measuring plate, while the particles were moist wherein at least 200 particles were measured.

2. The overall porosity was determined gravimetrically. To this end, a particle bed of different bed volume was defined by evacuation, conditioned and the weight of the removed moist and the dry samples was determined. The overall porosity [%] resulted from $$P_{overall} \frac{W_{moist} - W_{dry}}{W_{dry}} \times 100$$

This overall porosity comprises the pore volume and the volume of the attached water.

3. The content of the amine functions was determined by means of coloring agent adsorption using acid orange II. After being charged the coloring agent-laden particles were washed intensely (24 h) at a pH=3, the coloring agent was desorbed at a pH=12 and the color solution was measured spectroscopically at a wavelength of 492 nm.

4. The structure of the particle surface was determined before and after the treatment by raster electron microscopy. The samples which were dried after alcohol exchange were sputtered with gold/palladium.

EXAMPLE 1

Manufacture of the Microparticles/Carrier Matrix 1:

A solution of PEI was prepared dissolved in a solution mixture consisting of 96% N-methylpyrrolidon and 4% water by dissolution for 4 h at 80° C. After cooling, the solution was filtered and used in this state for the manufacture of microparticles by a spray process using a spray nozzle with an opening diameter of 300 μm.

The solution was sprayed with the aid of nitrogen via an air gap of 8 cm into a precipitation medium consisting of water. After the manufacture, the microparticles were washed with water several times and finally treated for 1 h at 100° C. and then again washed.

The particles obtained were characterized with respect to particle diameter, overall porosity, bed volume per g dry particles and the morphological appearance of the particle surface.

The following characteristic data were determined:

| | |
|---|---|
| Particle diameter range: | 210-330 μm |
| Overall porosity: | 81.4% |
| Bed volume/g of dry particles: | 8.0 ml |

EXAMPLES 2 TO 6

The micro-particles produced in example 1 were post treated with a 4% aqueous diethlenetriamine (DETA) solution at 90° C. for different periods. In order to realize this primary treatment the following experimental way was selected:

Microparticles of the example 1 with a bed volume of 25 ml were sedimented in a temperature-controlled container, the sediment was carefully removed. 40 ml of a 4% aqueous DETA solution was added at room temperature and placed into a shaking machine. After completion of the suspension, the suspension was heated by a thermostatically controlled heater, preheated to 90° C. and treated while being subjected to shaking. The point in time when the heater was connected was defined as treatment time 0.

The treated particles had the characteristics as shown in table 1.

TABLE 1

Characteristic data of the examples 2-6

| Example | Treatment time [min] | Particle diameter range [μm] | Overall porosity [%] | Amine content [n mol/mg - dry particles] |
|---|---|---|---|---|
| 1 | 0 | 210-330 | 81.4 | 0 |
| 2 | 30 | — | 83.1 | 78 |
| 3 | 60 | 210-330 | 86.7 | 125 |
| 4 | 90 | 210-330 | 88.8 | 173 |
| 5 | 105 | — | 91.4 | 211 |

In accordance with the data determined, the particle diameter range changed—if at all—only within the error range of the measurement, whereas the overall porosity increased as a result of the treatment (hydrophilization). Also, in a controlled adjustable way, a high content of amine functions were bound during the treatment to the membrane.

As a result, the overall porosity provided by pores with a pore diameter of more than 10 nm was increased by the treatment in comparison with untreated particles.

EXAMPLES 7 AND 8

The microparticles as manufactured in Example 1 were, in accordance with Example 2, post-treated with a 4% aqueous diethylenetriamine (DETA) solution at 90° C. for 30 min, cooled and washed with distilled water until the wash water was neutral. Subsequently, a second post treatment was performed under the same conditions with the difference that a 4% aqueous polyethyleneimine solution ($M_n$=600 D; $M_w$=800 D) was used as modifier solution and the post treatment was performed for 10 and respectively, 30 min.

The treated particles had the characteristics as shown in Table 2.

TABLE 2

Characteristic data of the example 7 and 8

| Example | Treatment time [min] | Overall porosity [%] | Amine content [nmol/mg - dry particles] |
|---|---|---|---|
| 2 | 30 | 83.1 | 78 |
| 7 | 30 + 10 | 83.1 | 127 |
| 8 | 30 + 30 | 83.3 | 131 |

Under these post treatment conditions, the content of amine groups could be increased without a noticeable increase in the overall porosity of the base particle.

EXAMPLE 9

The microparticles produced in Example 1 were post-treated in accordance with example 2 with a 4% aqueous diethylenetriamine (DETA) solution at 90° C. for 30 min, cooled and washed with distilled water until the wash water was neutral. Subsequently, a second post treatment was performed under the same conditions with the differences that a 4% aqueous polyethyleneimine solution ($M_M$=600 D; $M_w$=800 D) was used as modifier solution and the post treatment was performed for 10 min. After this second post treatment, the neutral washed particles were dried at room temperature and subsequently again moistened.

The treated particles had the characteristics as shown in table 3.

TABLE 3

Characteristic data of the examples 7 and 9:

| Example | Treatment time [min] | Overall porosity [%] | Amine content [nmol/mg - dry particles] |
|---|---|---|---|
| 7 | 30 + 10 | 83.1 | 127 |
| 9 | 30 + 30 | 78.1 | 127 |

With the drying the overall porosity was only slightly reduced. The amine content is identical within the measuring error of the determination technique. Consequently, the particles can be dried at room temperature without performance losses.

EXAMPLE 10

The microparticles as produced in example 1 were, as in example 2 post-treated with a 4% aqueous diethylenetriamine (DETA) solution at 90° C. for 30 min, cooled, and then washed with distilled water until the water was neutral. A second post treatment followed under the same conditions, however with the differences that a 4% aqueous polyethyleneimine solution ($M_n$=600 D; $M_w$=800 D) was used as modifier solution and the post treatment was performed for 30 min. After the second post treatment, the neutral washed particles were sterilized for 30 min at 121° C. in water using steam.

TABLE 4

Characteristic data of the example 8 and 10:

| Example | Treatment time [min] | Overall porosity [%] | Amine content [n mol/mg - dry particles] |
|---|---|---|---|
| 8 | 30 + 30 | 83.3 | 131 |
| 10 | 30 + 30 | 83.1 | 101 |

With the drying procedure, the overall porosity was not reduced. The amine content became slightly smaller apparently as a result of the following reaction. Consequently, the particles can be steam-sterilized without losses in performance.

EXAMPLE 11

The particles as produced and characterized in the example 1 and 2 were examined concerning compression stability with the passage of a PEG solution consisting of 0.2907 g PEG MG=2 Mio Dalton and 0.2907 g PEG MG=4 Mio Dalten, dissolved in 1 liter water. This solution had approximately a viscosity, which was comparable to the viscosity a human plasma. The pressure loss/pressure increase depending on the flow velocity is based on a bed height of 3 cm. The measuring arrangement permits pressure differences of maximally 2 bar to be determined safely. For comparison, Sephiarose® type CL-4B was included in the examination as a swell-porous carrier and Eupergit® type 250 L (aminated) was included as permanent-porous carrier.

The data of the measurements are represented in FIG. 1.

The results show that permanent-porous carrier matrices had a significantly improved compression stability. Whereas Sepharose® was compacted already at a flow speed of 120 an/h to such an extent the further flow was practically prevented the particles of the example 1 and particularly of the example 2 were found to be significantly more compression-resistant than Sepharose and moderately more compression resistant then Eupergit.

What is claimed is:

1. A method of manufacturing porous polyimide microparticles having pore diameters of more than 10 nm for forming carrier matrices for adsorbers, the method comprising the following steps:
    a) providing a polymer solution of at least one polyimide polymer and a solvent or a solvent mixture,
    b) converting the polymer solution to microparticles by spraying or thermal phase inversion,
    c) treating the microparticles obtained in step b) with an aqueous functionalization solution including 1 to 10 wt % of an amine-containing modifier chosen from the group of diamines and triamines, wherein the amine-containing modifier comprises at least one of a primary, a secondary and a tertiary amine group and further comprises alkylene groups with 2 to 5 C atoms interconnecting the amine groups, wherein the treatment is performed at a temperature of 50 to 100° C. for a period of 5 min to 4 hours, and
    d) washing the obtained modified microparticles to remove therefrom the amine-containing modifier.

2. The method as defined in claim 1, further comprising a step c2) conducted after removal of the amine-containing modifier in process step c), step c2) comprising treating the microparticles with an aqueous functionalization solution, which contains at least one further modifier, at a raised temperature, wherein the at least one further modifier comprises of at least one compound with at least two functional groups per molecule of which one is an amino group.

3. The method as defined in claim 1, wherein
    step a) includes providing the polymer solution with a polymer content of 1 to 20 wt %.

4. The method as defined in claim 1, wherein the at least one polyimide polymer for the manufacture of the polymer solution in the step a) is selected from the group consisting of pure polyimides, poly(amide-imides), poly(ester-amides) and poly(ether-imides).

5. The method as defined in claim 4, wherein the at least one polyimide-polymer has at least one imide group per base unit with a mole mass of not more than 1000 g/mol.

6. The method as defined in claim 2, wherein the at least one further modifier in the step c2) includes at least one of a hydroxyl- and a carboxyl group as functional group in addition to the amino group.

7. The method as defined in claim 1, wherein the amine-containing modifier in the aqueous functionalization solution is step c) is diethylene triamine.

8. The method as defined in claim 1, wherein step c) includes treating the microparticles with the aqueous functionalization solution within a period of 20 min to 2 hours.

9. The method as defined in claim 1, wherein step c) includes treating the microparticles with the aqueous functionalization solution at a temperature of 70 to 95° C.

10. The method as defined in claim 2, wherein the at least one further modifier in the step c2) is chosen from the group of aromatic diamines, alcohol amines, amino acids, imine diacetic acid, phenylene diamine, polyamines and mixtures thereof.

11. The method as defined in claim 1, further comprising, after step d), a step of drying the modified microparticles.

* * * * *